(12) United States Patent  
Asthana et al.

(10) Patent No.: US 7,978,216 B2  
(45) Date of Patent: Jul. 12, 2011

(54) VERSATILE CONFERENCE ADAPTER AND METHOD EMPLOYING SAME

(75) Inventors: Aseem Asthana, San Jose, CA (US); Shantanu Sarkar, San Jose, CA (US); Ashish Chotai, Santa Clara, CA (US); Sravan Vadlakonda, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1393 days.

(21) Appl. No.: 11/448,313

(22) Filed: Jun. 7, 2006

(65) Prior Publication Data

US 2007/0285503 A1    Dec. 13, 2007

(51) Int. Cl.
*H04N 7/15* (2006.01)

(52) U.S. Cl. .................................... 348/14.09; 348/260

(58) Field of Classification Search ............... 348/14.09, 348/14.08, 14.06; 370/260, 261
See application file for complete search history.

(56) References Cited

U.S. PATENT DOCUMENTS

| 2004/0003046 A1* | 1/2004 | Grabelsky et al. | 709/206 |
| 2005/0108328 A1* | 5/2005 | Berkeland et al. | 370/260 |
| 2006/0098635 A1* | 5/2006 | Ravindranath et al. | 370/352 |

OTHER PUBLICATIONS

K. El Malki, "Low Latency Handoff in Mobile IPv4", Network Workin Group, Aquired at: http://www.ietf.org/ids.by.wg/mip4.html, 56 pages, Oct. 3, 2005.

* cited by examiner

*Primary Examiner* — Stella L Woo
(74) *Attorney, Agent, or Firm* — Fish & Richardson P.C.

(57) ABSTRACT

A conference adapter. In an illustrative embodiment, the conference adapter implements a method for interfacing one or more conference endpoints with one or more conference servers. The method includes registering an endpoint and a conference server to determine endpoint registration information associated with the endpoint and to determine conference-server registration information associated with the conference server. Next, the method includes receiving a connection from the endpoint and a connection from the conference server. Subsequently, the conference adapter establishes communications between the endpoint and the conference server as initiated by the endpoint and based on the endpoint registration information and the conference-server registration information. In a more specific embodiment, the method further includes receiving plural connections from conference servers of disparate types, and then selectively switching communications between the endpoint and a first conference server to communications between the endpoint and a second conference server. The method further includes selectively switching endpoints for a given conference session.

42 Claims, 4 Drawing Sheets

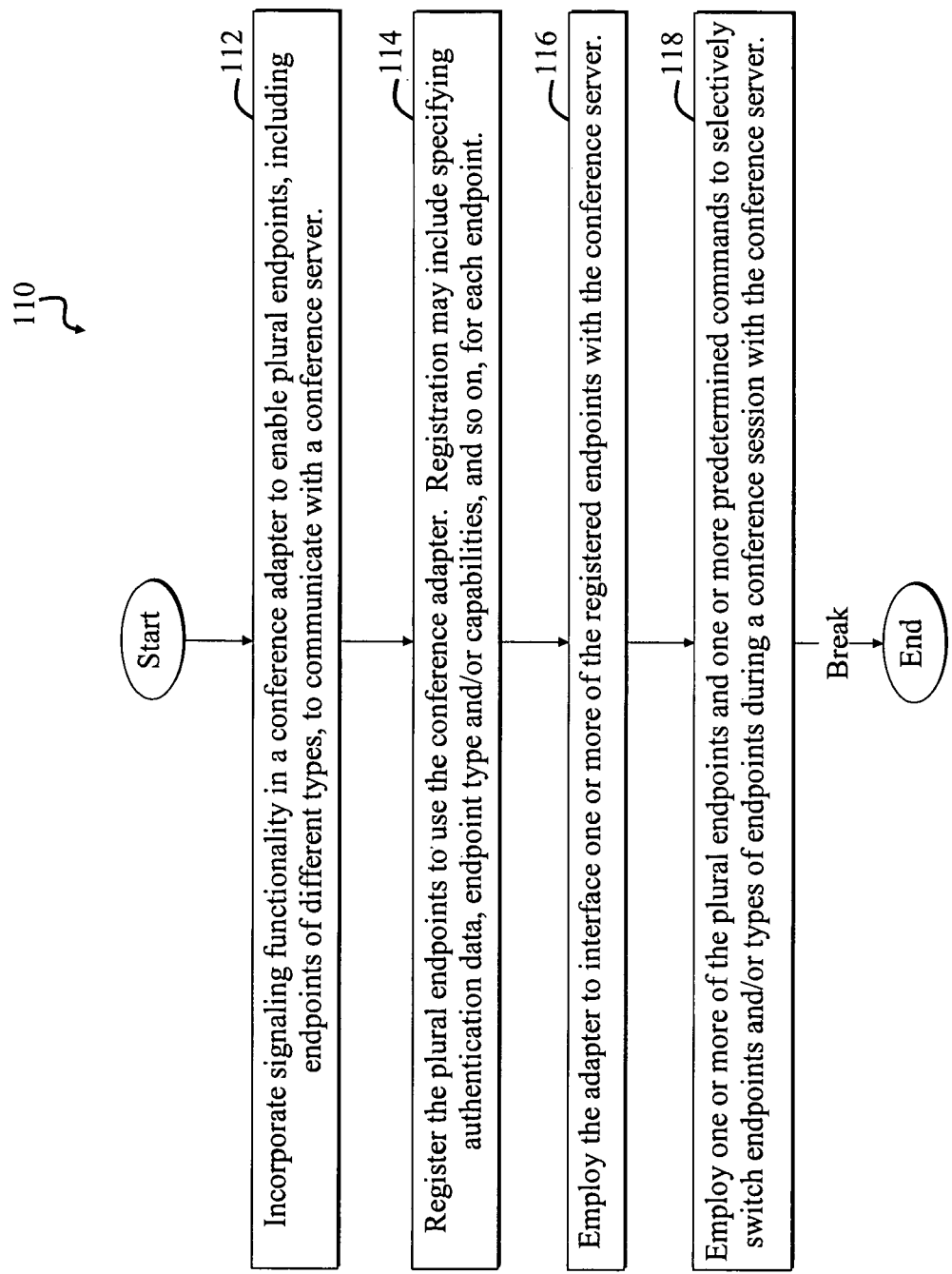

VERSATILE CONFERENCE ADAPTER AND METHOD EMPLOYING SAME

BACKGROUND OF THE INVENTION

This invention is related in general to communications systems and more specifically relates to systems and methods for interfacing communications systems and/or devices.

Systems for interfacing communications systems are employed in various demanding applications, including network routers, telecommunications gateways between packet-switched and circuit-switched networks, and controllers for transitioning multimode phones between different types of networks, such as cellular or WiFi networks. Such applications often demand versatile interfacing systems, such as gateways that enable communications between disparate networks, protocols, and/or devices.

Versatile interfacing systems are particularly important in conferencing applications, where many disparate types of conference systems and accompanying user-interface terminals, called endpoints, exist. The different types of conference systems may be mutually incompatible. For example, a conference controller or server for one type of conference system may not allow communications with another type of conference system. Furthermore, conference endpoints for one conference system may be incompatible with another.

A user may have multiple endpoints associated with different types of conference systems. The user is often limited to using the endpoint that is specifically designed or configured for a given type of conference system. Unfortunately, such incompatibilities between different types of conference systems and endpoints are problematic, such as when users of different types of conference systems and/or endpoints wish to intercommunicate.

BRIEF DESCRIPTION OF THE DRAWINGS

FIG. 4 is a flow diagram of a second method adapted for use with the conference adapter of FIG. 1-2.

DETAILED DESCRIPTION OF EMBODIMENTS OF THE INVENTION

Figure 1:
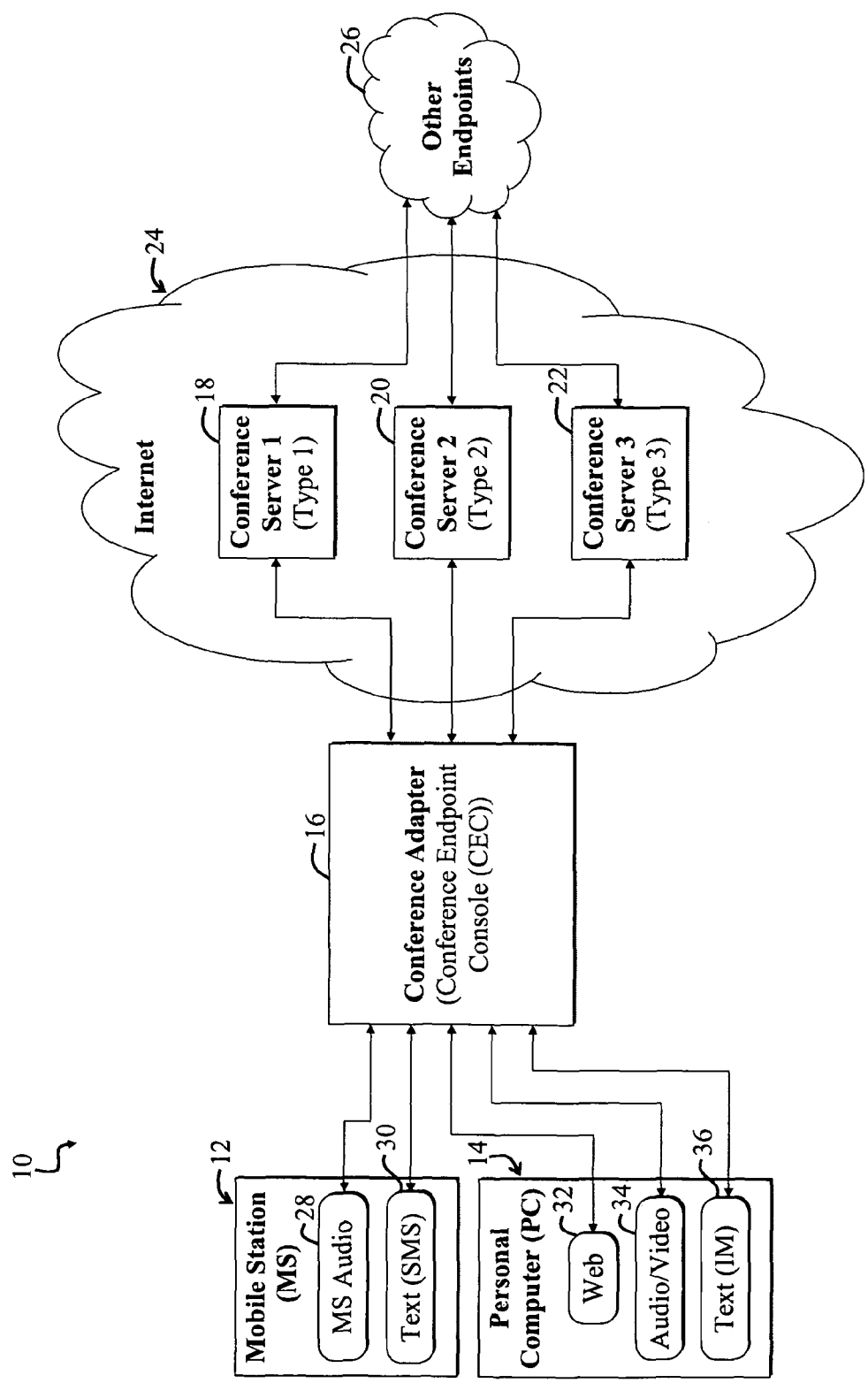
FIG. 1 is a diagram of an integrated conference system and accompanying adapter for interfacing disparate conference systems and endpoints according to an embodiment of the present invention.

A preferred embodiment of the present invention implements an adapter or gateway, called a Conference Endpoint Console (CEC), for interfacing communications between one or more endpoints, such as wireless phones, laptop computers, or other clients, and one or more conference servers. The adapter is designed to enable seamless switching of endpoints and/or conference servers during a communication session occurring via the adapter. The adapter further addresses incompatibilities between different types of endpoints and conference servers, enabling seamless communications between otherwise incompatible devices.

For the purposes of the present discussion, different or disparate types of endpoints may be endpoints associated with different basic functionality. Examples of disparate types of endpoints include a cellular telephone and a laptop computer, or a SIP telephone and a desktop computer. Different configurations of endpoints or conference servers may be distinguished by state, wherein the state is defined by characteristics or functionality associated with the state. For example, an endpoint configured to operate in an audio-only mode is said to be in a different configuration or state than an endpoint configured to operate in a text-only mode or state.

Certain embodiments of the present invention may allow a user to use one endpoint to communicate with different types of conference systems; to use different types of endpoints with a given type of conference system; or to use plural types of endpoints with plural types of conferencing systems. Such compatibility between conference systems and associated endpoints is achieved without additional signaling between the conference systems and the CEC. Furthermore, existing endpoints need not be modified to work with certain embodiments of the present invention.

For example, a user participating in a Rich Media Conference (RMC) with audio, Web, video and Instant Messaging (IM), could log in to the adapter via a cellular phone and receive conference audio. The user may later log in to the adapter via a Personal Digital Assistant (PDA) and request voice and Web portions of the conference. The user may then switch to a different full-featured endpoint to enable employing audio, Web, video, and IM modalities to participate in the conference. For the purposes of the present discussion, the terms conference and conference session are employed interchangeably.

The adapter may insulate the conference servers and the endpoints from any undesirable impacts, such as dropped conference sessions or data loss, resulting from switching endpoints or conferences. A user may employ an endpoint and the adapter to join and switch between conferences hosted by conference servers belonging to different vendors. The adapter may further provide a consistent or unified user interface for communicating with different conference servers. The adapter may provide various additional features, such as personal-assistant features, as discussed more fully below.

For clarity, various well-known components, such as video processors, power supplies, communications ports, hubs, modems, gateways, firewalls, network cards, video capture cards, Internet Service Providers (ISPs), and so on, have been omitted from the figures. However, those skilled in the art with access to the present teachings will know which components to implement and how to implement them to meet the needs of a given application.

FIG. 1 is a diagram of a network 10 that implements an integrated conference system. The integrated conference system 10 includes a conference adapter 16 for interfacing disparate conference systems 18-22 and endpoints 12, 14, 26 according to an embodiment of the present invention. The integrated conference system 10 further includes a mobile station 12 and a personal computer 14, which act as endpoints that communicate with the conference adapter 16.

The mobile station 12, personal computer 14, conference adapter 16, and conference servers 18-22 are considered conference devices for the purposes of the present discussion. A conference device may be any entity employed to facilitate communications between two or more parties or entities participating in a conference. Additional examples of conference devices may include computer Web-terminals, video-conferencing terminals, and so on.

For the purposes of the present discussion, a mobile station may be any device, such as a client, that can wirelessly communicate with a network. Examples of mobile stations include wireless phones, cell phones, laptops with IEEE 802.11 wireless cards, other wireless clients, and so on. A client may be any device that receives information from a network, such as from a server in the network, such as in response to a query or a push from the server to the client. An endpoint may be any device or terminal that is adapted to provide user input to a network or communications session, such as a conference. Hence, an endpoint may be a client and/or a mobile station and vice versa.

For illustrative purposes, the mobile station 12 is shown including Mobile Station (MS) audio functionality 28 and Short Message Service (SMS) text functionality 30, which may be employed to communicate with the conference adapter 16. The Personal Computer (PC) 14 includes Web-conferencing functionality 32, audio/video-conferencing functionality 34, and Instant Messaging (IM) text functionality 36, which may be employed to communicate with the conference adapter 16.

The conference adapter 16 is coupled to a first conference server 18, a second conference server 20, and a third conference server 22, which are conference servers of disparate types, including a first type, a second type, and a third type, respectively. The conference servers 18-20, which are also called conference controllers, are optionally included in a packet-switched network or other type of network, such as the Internet 24. The conference servers 18-22 are optionally coupled to other endpoints 26, each of which may join a conference hosted by one of the conference servers 18-22.

For the purposes of the present discussion, types of network entities, such as conference servers or endpoint are distinguished by capabilities and/or inter compatibility of the network entities. For example, different types, i.e., disparate types, of conference servers typically employ incompatible signaling and/or functionality. Certain embodiments of the present invention may bridge or otherwise make the signaling and/or functionality compatible so that different types of network entities may intercommunicate, as discussed more fully below.

A conference server may be any entity, such as a controller or other conference system, that coordinates or otherwise facilitates interconnecting plural endpoints in a conference session. A conference session may be any communication session between plural parties, including text, audio, video, combinations thereof and/or other types of communications sessions.

In operation, the conference adapter 16 incorporates functionality, which may be implemented via one or more hardware and/or software routines, for making the mobile station 12 and the personal computer 14, which represent different types of endpoints, compatible with the different types of conference servers 18-22. Each type of conference server 18-22 may employ signaling and may provide capabilities that are otherwise incompatible with the signaling and/or capabilities of one or more of the endpoints 12, 14.

While the endpoints 12, 14 are shown including only the mobile station 12 and the personal computer 14, other types of endpoints may be employed without departing from the scope of the present invention. For example, the mobile station 12 may be implemented via a Session Initiation Protocol (SIP) phone, a Bluetooth client, a Wi-Fi client, or other device. Similarly, the personal computer 14 may be a laptop, a pocket computer, such as a PDA, or other type of client. Furthermore, while only two different types of endpoints 12, 14 are shown, different numbers of endpoints of various types or of similar types may be employed with embodiments of the present invention without departing from the scope thereof.

Furthermore, while the present embodiment is discussed as employing three conference servers 18-22, each of different types, conference servers of similar types may be employed. Furthermore, more or fewer than three conference servers may be employed.

In an exemplary operative scenario, a user of the personal computer 14 may wish to join or initiate a conference session hosted by the first conference server 18. The user may employ the personal computer 14 to connect to the conference adapter 16, such as via a wireless access point, an Internet Service Provider (ISP), etc. The conference adapter 16 may be implemented in a network endpoint, a router, an ISP network, etc.

The conference adapter 16 maintains predetermined registration information pertaining to the personal computer 14. The predetermined registration information may include log-in passwords, usernames, and/or other types of authentication data, such as cookies, to enable the conference adapter 16 to authenticate the personal computer 14 and authorize use of certain conference services and functionality.

The conference adapter 16 also maintains registration information for the conference servers 18-22 and also contains support and signaling functionality necessary to communicate with the conference servers 22 in response to communications from endpoints 12, 14. The conference adapter 16 includes conversion functionality to convert signaling and functionality, including protocols, as needed to seamlessly establish communications between the endpoints 12, 14 and one or more of the conference servers 18-22 as desired.

In the present illustrative scenario, the personal computer 14 employs one or more modalities or functionality 32-36 to participate in a conference hosted by the first conference server 18 after logging into the conference adapter 16 and initiating or joining a conference hosted by the first conference server 18. Subsequently, during a conference session between the personal computer 14 and the first conference server 18, the user of the personal computer 14 decides to continue participating in the conference session, but wishes to employ the mobile station 12 instead of or in addition to the personal computer 14.

The user may then employ the mobile station 12 to dial into the conference hosted by the first conference server 18 while the conference session between the personal computer 14 and the first conference server 18 is ongoing. Subsequently, after the mobile station 12 has joined the conference session, the user may exit the personal computer 14 from the conference session while continuing the conference session with the mobile station 12. The ability of the user to switch between use of the personal computer 14 and the mobile station 12 during a conference session is enabled by the conference adapter 16. The conference adapter 16 enables endpoints of different types or similar types to connect to one or more conference servers of different or similar types.

Alternatively, when the user is employing the personal computer 14 during a conference session and wishes to switch to the mobile station 12, the user may activate a conference-recording feature at the conference adapter 16. The conference-recording feature is particularly useful when the mobile station 12 is not within reach of the user. For example, the user may need to go to a separately located car to access the mobile station 12, which may be a car phone.

The user may activate the conference-recording feature of the conference adapter 16 by entering a predetermined user-interface command via the personal computer 14. The command is forwarded from the personal computer 14 to the conference adapter 16 as a control signal that is sufficient to activate the conference-recording feature, i.e., recorder at the conference adapter 16.

When the conference-recording feature is activated, the user may disconnect the personal computer 14 from the conference session. Subsequently, in the present operative scenario, the user employs the mobile station 12 to join the conference session hosted by the first conference server 18. However, before joining the conference session, the user of the mobile station 12 enters authentication information as needed to access the conference recording that was earlier initiated via the personal computer 14. The user then plays back the recording, via the conference-recording feature, at a higher rate before rejoining the conference session, so as to catch up with the conference session. Alternatively, the user joins the conference session midstream without reviewing recorded information. The user may save the recording for future reference. Hence, the conference-recording feature may facilitate switching endpoints during a conference without losing data pertaining to the conference session.

The conference information recorded by the conference-recording feature may include recorded text, audio, video, and/or other types of media. If the user has selected and activated text-based recording via the conference-recording feature, then the user may download recorded text to the mobile station 12, such as via an SMS message, which may facilitate catching up to the conference session. If the user has activated audio/video recording, the conference adapter 16 employs predetermined knowledge of the mobile station 12 to ensure that only the audio portion of the audio/video recording is forwarded to the mobile station 12 in response to a request from the mobile station 12 for recorded content.

In a second operative scenario, the user of the mobile, station 12 wishes to switch to or otherwise initiate a second conference session hosted by the second conference server 20. The user may activate, via the mobile station 12, conference switching functionality provided by the conference adapter 16. Exact details pertaining to commands employed by the mobile station 12 to switch between conferences, are application specific. Those skilled in the art with access to the present teachings may readily implement requisite commands to meet the needs of a given implementation without undue experimentation.

After switching between the first and the second conference sessions hosted by the first conference server 18 and the second conference server 20, respectively, the user wishes to join or otherwise initiate a third conference session hosted by the third conference server 22. The user of the mobile station 12 may then employ the mobile station 12 to switch between the conference sessions as desired.

Subsequently, the user wishes to join or combine the three conference sessions hosted by the different conference servers 18-22. The user then employs the mobile station 12 to send one or more control signals to the conference adapter 16 that are sufficient to activate conference-bridging functionality implemented in the conference adapter 16. The conference adapter 16 then bridges conference sessions hosted by the conference servers 18-22, thereby combining them into a single conference that is accessible by the mobile station 12.

Subsequently, in the present operative scenario, the user of the mobile station 12 receives an incoming call while participating in the conference 10. The mobile station 12 may have previously activated automatic personal-assistant functionality included in the conference adapter 16 that may automatically detect, such as based on an audible call-waiting signal, when the mobile station 12 has an incoming call. The personal-assistant functionality may then automatically lower the volume of the conference session by a predetermined amount to enable the user of the mobile station 12 to retrieve the incoming call. The incoming call may be muted to other participants it in the conference session. The personal-assistant functionality is particularly useful with Session Initiation Protocol (SIP) phones, where SIP may be employed to enhance call-waiting functionality without requiring prohibitive modification to a SIP phone.

Hence, the conference adapter 16 is particularly useful to enable the mobile station 12 to switch between conferences hosted by conference servers of different types. Accordingly, previously incompatible endpoints may now communicate with previously incompatible conference servers as needed.

Figure 2:
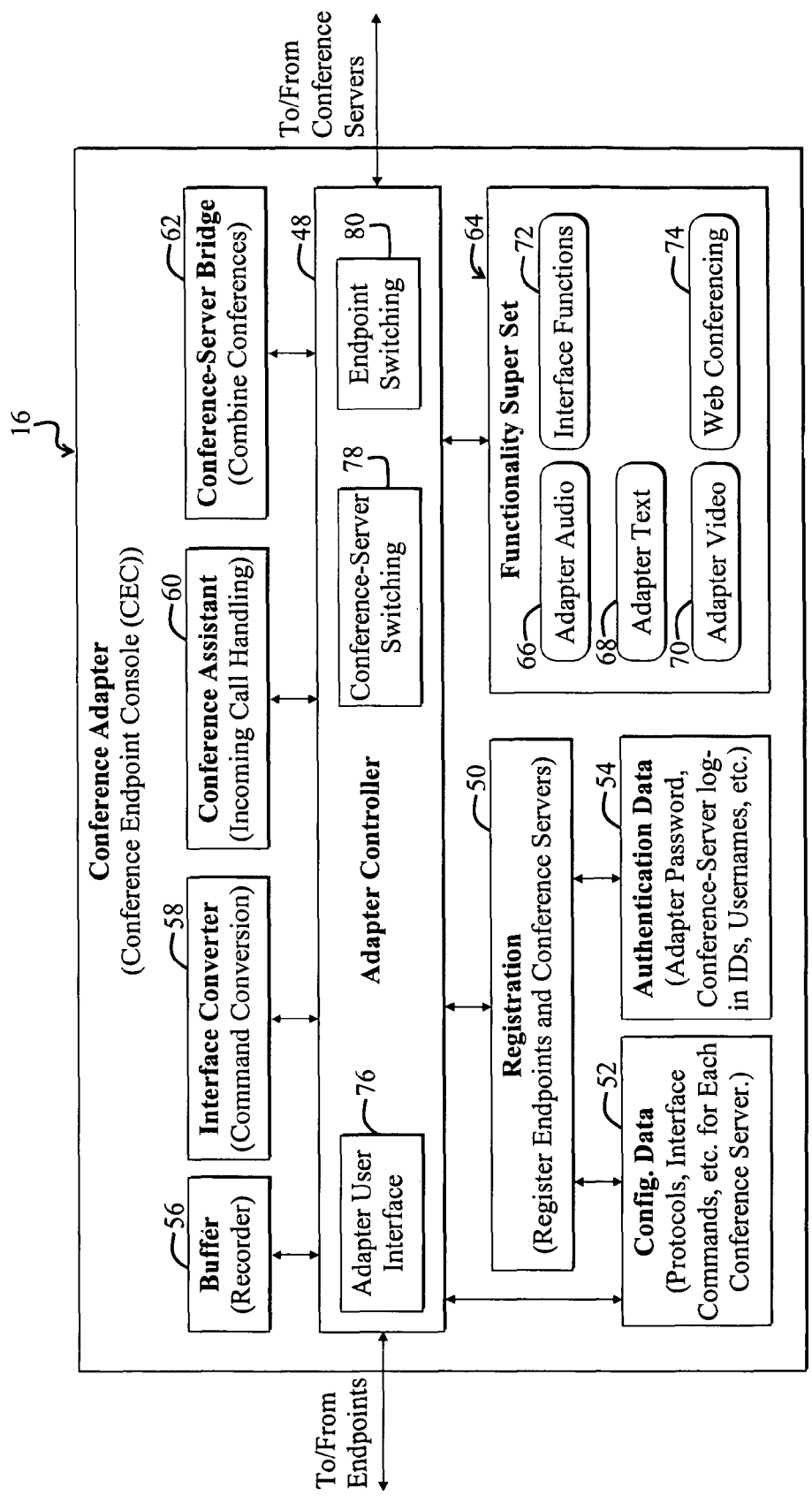
FIG. 2 is a more detailed diagram illustrating the conference adapter of FIG. 1.

FIG. 2 is a more detailed diagram illustrating the conference adapter 16 of FIG. 1. The conference adapter 16 is also called a CEC or a conference gateway. For the purposes of the present discussion, a CEC may be any device or network entity that may act as an adapter between an endpoint and a conference server to facilitate compatible communications between the endpoint and the conference server. A conference server may be any conference device, such as a controller, that facilitates interconnecting parties of a conference session.

With reference to FIGS. 1 and 2, the conference adapter 16 includes an adapter controller 48 that communicates with the mobile station 12 and the personal computer 14 and further communicates with the plural conference servers 18-22. The adapter controller 48 employs functionality implemented in various modules of the conference adapter 16 to facilitate interfacing the mobile stations 12, 14 with the conference servers 18-22 and to facilitate converting signaling between the mobile stations 12, 14 and conference servers 18-22 to make the signaling compatible between the conference devices 12-22.

The conference adapter 16 further includes a registration module 50, a functionality super set 64, a recording buffer 56, an interface converter 58, a conference assistant 60, and a conference-server bridge 62, which communicate with the adapter controller 48. The registration module 20 has access to authentication data 54, which may include adapter-login password, conference-server login identification numbers, usernames, and so on. The registration module 50 and the adapter controller 48 have direct access to configuration data 52, which may include communications protocols, interface command sets, and so on, employed by each conference server and the adapter 16 itself. The registration module 50 may run one or more routines for collecting the configuration data 52 and the authentication data 54 directly from the conference servers 18-22 and/or the endpoints 12, 14, or via a user interface 76. The user interface 76 may implement additional functionality enabling a user to employ the user interface 76 as an endpoint to join a conference session hosted by one or more of the servers 18-22. The user interface 76 may also enable a user to configure the conference adapter 16; update the conference adapter 16 to work with additional types of endpoints and conference servers; register certain endpoints and conference servers, and so on.

The adapter controller 48 is shown further including a conference-server switching module 78 and an endpoint-switching module 80. While the user interface 76, and the controller modules 78, 80 are shown implemented in the adapter controller 48, they may be implemented as modules that are external to the adapter controller 48 but in communication with the adapter controller 48, without departing from the scope of the present invention. Similarly, various other adapter modules 50-74 may be integrated with the adapter controller 48 as part of an overall adapter program without departing from the scope of the present invention. Those skilled in the art with access to the present teachings may readily implement functionality represented by various components of the conference adapter 16 without undue experimentation.

The functionality super set 64 includes a super set of functionality employed by endpoints 12, 14 and the conference servers 18-22 to participate in a conference. For example, the first type of conference server 18 may enable audio and text conferences in a first format. The mobile station 12 may participate in audio and text portions of a conference session in a second format via the MS audio functionality 28 and text functionality 30. Accordingly, the functionality super set 64 includes adapter audio functionality 66, which implements one or more routines for handling and converting audio signals in the first format and the second format. Similarly, the functionality super set includes adapter text functionality 68 that can handle and convert text signals in the first format and the second format. For illustrative purposes, the functionality super set 64 is shown further including adapter video functionality 70, Web-conferencing functionality 74, and interface functions 72. The interface functions 72 may represent a repository of commands employed by various conference servers and commands that can be entered by each endpoint 12, 14.

In operation, the interface converter 58 may access the interface functions 72 and map incoming commands from the endpoints 12, 14 to a standard set of commands provided by the conference adapter 16. The standard set of commands provided by the conference adapter 16 are mapped by the interface converter 58 to commands associated with each conference 18-22 as needed to enable the endpoints 12, 14 to control and use conference functionality afforded by each of the conference servers 18-22.

When a user enters a command via one of the endpoints 12, 14, the command is delivered to the conference adapter 16 as a control signal. The control signal is received by the adapter controller 48, which accesses the interface converter 58 as needed to convert the command to an appropriate command before forwarding the command to the intended conference server. The interface converter 58 access the interface functions 72 as needed to implement a given command conversion.

For example, pressing #5 on a keypad of the mobile station 12, may activate mute for a MeetingPlace conference server, such as the first conference server 18, if the mobile station 12 were communicating directly with the first conference server 18. Pressing #44 when communicating directly with the second conference server 20 may activate the mute. The conference adapter 16 may employ #5 to mute any conference session hosted by any of the conference servers 18-22. Accordingly, when the mobile station 12 is participating in a conference session hosted by the second conference server 20 and presses #5, the conference session will be muted. Hence, the conference adapter 16 employs the interface converter 58 to conceal the fact that the second conference server 20 employs #44 for mute rather than #5. Accordingly, the interface converter 58 incorporates one or more routines for translating interface commands. Exact details for implementing a command-conversion interface are application specific. Those skilled in the art with access to the present teachings may readily implement specific signal-conversion functionality as needed for a particular application, without undue experimentation. Accordingly, the command-translation functionality implemented by the interface converter 58 handle various types of commands as needed, such as commands corresponding to Dual Tone Multi-Frequency (DTMF) or SIP-event packages.

Accordingly, the conference adapter 16 provides a common user interface, i.e., user-interface commands and/or other functionality, for the endpoints 12, 14 for various conferencing features. The endpoints 12, 14 may participate in conference sessions on different conference servers 18-22, where each conference server has a different set of user interface commands. The conference adapter 16 may map the user interface corresponding to a given endpoint 12, 14 to the corresponding user interface on each different conference server 18-22. Hence, the a user does not need to remember how to use different conference-server interfaces, but instead can learn the unified interface offered via the conference adapter 16.

Interface conversion performed by the interface converter 58 is not necessarily limited to conversion of interface commands. For example, the conference adapter 16 may provide similar graphical user interfaces to endpoints that can support the graphical user interface. For example, the mobile station 12 may include a browser that can browse to the conference adapter 16 and open the interface provided by the conference adapter 16 as a webpage, without departing from the scope of the present invention.

The adapter controller 48 includes one or more routines for employing the buffer 56 to record a conference session as needed to prevent loss of data during switching of endpoints or conference servers during a communication session handled by the conference adapter 16. The buffer 56 represents the conference-recording feature that may also enable a user, such as the user of the personal computer 14 of FIG. 1, to catch up to a conference. For example, the user may activate, such as via a predetermined command, one or more routines in the adapter controller 48 to playback at a higher than standard rate recorded contents of a particular conference session that is or was being recorded in the buffer 56.

The recording functionality offered by the buffer 56 is particularly useful, for example, when a user cannot attend a conference session on time. The user may employ an endpoint 12, 14 and one or more of the predetermined interface functions 72 to instruct the conference adapter 16 to record the conference. Hence, the conference adapter 16 may act as a streaming endpoint, receiving a media stream and recording the media, until a given endpoint enters the conference session via the adapter controller 48, at which point the conference adapter 16 may act as a two-way interactive endpoint.

The adapter controller 48 may run one or more routines for selectively employing conference assistant 60 in response to one or more commands, i.e., control signals received from an endpoint 12, 14. The conference assistant 60 may provide various functionality usable by one or more of the endpoints 12, 14. For example, the conference assistant 60 may be configured to automatically adjust the volume of an audio conference session in response to a given command received by one of the endpoints 12, 14, or automatically in response to detection of a specific event detected by the conference assistant 60. For example, the specific event may be the detection of an incoming call to the mobile station 12, which may be a SIP phone. The volume of the audio conference session is then lowered, while the user of the mobile station 12 simultaneously connects to the incoming caller. The audio of the conference session may be played in the background as heard from the mobile station 12. The conference session may be inaudible to the incoming caller and to other participants of the audio conference session.

Those skilled in the art with access to the present teachings may readily implement various types of conference-assistant functionality 60. The increasingly widespread use of SIP phones may further enhance types of conference-assistant functionality that may be incorporated in embodiments of the present invention.

The conference-server bridge 62 incorporates conference-bridging functionality that may be selectively activated by the adapter controller 48 in response to one or more predetermined commands from one or more of the endpoints 12, 14. For the purposes of the present discussion, conference-bridging functionality may be functionality that enable combining conference sessions hosted by different conference servers, such as two or more of the conference servers 18-22 of FIG. 1, into a single conference.

In one operative scenario, a user of the mobile station 12 joins several separate conference sessions hosted by the different conference servers 18-22 and actively employs conference-server switching module 78 implemented by the adapter controller 48 to switch between conference sessions hosted by the conference servers 18-22. Subsequently, the user of the mobile station 12 decides to merge the conference sessions by issuing one or more predetermined commands, which are sent as control signals from the mobile station 12 to the conference-adapter controller 48. The adapter controller 48 then employs the conference-server bridge 62 to combine communications from the various conference servers 18-22 into a single unified conference session integrated by the conference adapter 16. The unified conference session is accessible to not only the mobile station 12 and the personal computer 14 endpoints of FIG. 1, but the other endpoints 26 that were originally participating in individual conference sessions hosted by the conference servers 18-22.

The registration module 50 includes one or more routines for facilitating configuring the conference adapter 16 to work with various types of endpoints and conference servers. The registration module 50 may collect the authentication data for conference servers 18-22 and endpoints 12, 14. For the purposes of the present discussion, authentication data or information may be any information that may be employed to determine if and/or how a client or other network entity is authorized to access a network or to otherwise employ certain services thereof. Examples of authentication data include a login-password and username for endpoints accessing the conference adapter 16, login passwords and/or other identification or access information for a given conference session, and so on.

The authentication data 54 includes adapter login information and conference-server login information. Page: 14 Adapter login information may be a username, password, and/or other data usable for authentication and/or identification of a network entity, such as one of the endpoints 12, 14, by the conference adapter 16. Similarly, conference-server login information may be information employed by a conference server, such as one of the conference servers 18-22, to authenticate or otherwise identify and accept or reject a connection from another network entity, such as an endpoint client. In the present specific embodiment, the adapter login information may be employed to enable one or more of the endpoints 12, 14 endpoint to automatically log in to plural conference servers 18-22 without requiring the endpoints 12, 14 to login separately to each conference server 18-22, i.e., to enter separate conference login information to each conference server 18-22.

The configuration data 52 collected by the registration module 50 may include protocol information, additional interface commands employed by a given conference server, and other information needed by the conference adapter 16 for a particular implementation.

In the present specific embodiment, the configuration data may further include dial-in numbers, Internet Protocol (IP) addresses of conference servers, and/or other data needed by the conference adapter 16 to automatically connect to one or more conference sessions hosted by one or more of the conference servers 18-22. The registration module 50 may collect sufficient registration information to enable a user of one of the endpoints 12, 14 to connect with the conference adapter 16; log in to the conference adapter 16 by entering adapter login information; and then readily connect to one or more conference sessions hosted by one or more of the conference servers 18-22. The conference adapter 16 may employ the predetermined authentication data 54 and configuration data 52 to connect to the conference servers 18-22 as commanded by the user, without requiring the user to re-enter authentication data for each conference server 18-22.

The conference-server switching module 78 incorporates one or more routines for enabling one or more of the endpoints 12, 14 to selectively switch communications between conference sessions hosted by the different conference servers 18-22.

The endpoint-switching module 80 incorporates one or more routines for enabling a user to switch endpoints 12, 14 used for a particular conference session.

Hence, the conference adapter 16 may act as a media/signaling proxy and a conference manager for a user who subscribes to services offered by the conference adapter 16. The conference adapter 16 may support multiple conference devices 12, 14 registered with a subscriber.

The conference adapter 16 may manage a signaling stream/media stream to/from the network 10 for a given conference session. Devices, such as the endpoints 12, 14, that are registered by a subscriber are positioned behind the conference adapter 16. The conference servers may lack knowledge of the existence of multiple endpoints 12, 14 beyond the conference adapter 16. Communication between the conference adapter 16 and the endpoints 12, 14 may be based on one or more protocols, such as SIP or another standard protocol.

All endpoints 12, 14 or other devices associated with a subscriber initially register with the conference adapter 16, such as via the registration module 50. The conference adapter 16 employs the functionality super set 64, which represents a super set of media and signaling capabilities for all the endpoints 12, 14 in the conference, and consequently, may support various signal streams, including audio, video and Web streams to/from the network 10.

The conference adapter 16, which may also be called a proxy manager, may act as a Back-to-Back User Agent (B2BUA) in a SIP environment that can perform various roles for a given endpoint. The roles include enabling an endpoint to participate in conference sessions on different conference servers, where each conference server and/or associated conference session support different features and signaling mechanisms. The conference adapter 16 may act as an adapter that can handle various conference-server features, endpoint features, and signaling and media negotiations across different disparate conference servers.

The conference adapter 16 performs signaling/media negotiations with the conference servers 18-22 on the behalf of the endpoints 12, 14, while maintaining a common or otherwise compatible signaling protocols and methods with each of the endpoints 12, 14.

The conference adapter 16 may support spanning across multiple conferences, such as via the conference-server bridge 62. Hence, an endpoint may participate in multiple conferences on different conference servers, such as conference servers made by different vendors, and could periodically switch from one conference server to another.

When an endpoint, such as the mobile station 12 of FIG. 1, switches between conference sessions hosted by the conference servers 18-22, additional negotiations may occur between the conference adapter 16 and the conference servers 18-22. Alternatively, the conference adapter 16 remains connected to the conferences 18-22, while switching the mobile station 12 between conferences as desired, thereby obviating the need for the mobile station 12 to login again to each conference session to which the mobile station 12 will switch. In this case, the conference adapter 16 is said to reserve connections between the conference adapter 16 and the conference servers 18-22. By reserving connections, the conference adapter 16 may enable the endpoints 12, 14 to switch between conference sessions hosted by the conference servers 18-22 without the conference servers 18-22 knowing that the switch is occurring or occurred.

The conference adapter 16 includes hardware and/or software routines to handle signaling and/or media negotiations with the conference servers 18-22 as needed for a particular application. For example, a traveling user participating in a conference session via the mobile station 12 may switch to the personal computer 14 or other client and resume the conference session upon returning to an office.

Conventionally, to switch endpoints, a given conference session is interrupted, and excess signaling between an endpoint and a conference server is required to reestablish a conference session with a different endpoint. Certain embodiments of the present invention obviate the need to interrupt a conference session and invoke excess signaling between an endpoint and a conference server to reestablish a given conference session.

Hence, the conference adapter 16 incorporates various modules and functionality to interface a single endpoint to multiple types of conference server, simultaneously or separately; to allow an endpoint to seamlessly switch between multiple disparate conference systems or to connect simultaneously to multiple disparate conference systems; to interface different types of endpoints to a single type of conference server or multiple conference servers; to seamlessly transfer a conference session from one endpoint to another without requiring additional signaling between the conference adapter 16 and the associated conference server; to provide a common user interface for an endpoint to use for conferencing features offered by different conference servers; to prevent loss of data when switching endpoints during a conference; to provide personal-assistant functionality, such as facilitating handling incoming calls to an endpoint during a conference; to act as a bridge between different conference servers, and so on.

With reference to FIGS. 1 and 2, the conference adapter 16 may be considered more generally as an apparatus or system for integrating disparate conference system components 12, 14, 18-22, wherein the adapter includes a first mechanism 48, 50, 52, 54 for establishing a first conference session between a first conference entity, such as the first endpoint 12 or the first conference server 18, and a second conference entity, such as the first conference server 18 or the first endpoint 12, respectively. A second mechanism 78, 80 maintains the first conference session while switching the conference session to occur between the first conference entity 12, 18 and a third conference entity, such as the second conference server 20 or the personal computer 14. This results in the first conference session being between the second conference entity 18, 12 and the third conference entity 20, 14. For the purposes of the present discussion, Page: 17 a communications session or a conference session is said to be maintained when one or more of the participants or network entities in a conference session remain connected to a conference session.

The apparatus further includes a third mechanism 50-54 that is adapted to register an endpoint, such as the mobile station 12 corresponding to the first conference entity and determining endpoint functionality in response there to. The endpoint functionality, such as available modalities, including the MS audio functionality 28 and the SMS text functionality 30 may be provided as configuration data 52 in the conference adapter 16.

A fourth mechanism 50-54, registers a conference server, such as the first conference server 18, corresponding to the second conference entity and determines conference server functionality in response thereto. The conference server functionality, which may include conference audio, video, and text functionality supported by a conference server may also be included in the configuration data 52. The configuration data 52 may be accessed by the functionality super set 64 via the adapter controller 48 as needed to enable the functionality super set 64 to determine which functionality to employ for a given conference session.

A fifth mechanism 48, 52, 64 determines compatible functionality between the endpoint 12 and the conference server 18 based on the endpoint functionality and the conference functionality and employs the compatible functionality to facilitate communications between the endpoint 12 and the conference server 18. For the purposes of the present discussion, compatible functionality between two entities may be functionality that may be implemented to facilitate conferencing between the two entities.

Alternatively, the conference adapter 16 may be considered an apparatus for interfacing one or more conference endpoints with one or more conference servers, wherein the apparatus includes a registration module 50, 52, 54 adapted to register an endpoint, such as one or more of the endpoints 12, 14 of FIG. 1, and plural conference servers, such as the servers 18-22 of FIG. 1, and to determine endpoint registration information 52, 54 associated with the endpoint 12, 14 and to determine conference-server registration information 52, 54 associated with each of the plural conference servers 18-22. A control module, such as the adapter controller 48, is adapted to receive a connection from the endpoint 12, 14 and connections from each of the conference servers 18-22 and to selectively establish communications between the endpoint 12, 14 and one or more of the plural conference servers 18-22 in response to control input from the endpoint 12, 14 and based on the endpoint registration information 52, 54 and the conference-server registration information 52, 54.

For the purposes of the present discussion, the term establishing communications may mean to initiate any form of information or data transmission and/or reception. The term establishing a conference may mean to initiate any connection via which participants may exchange information.

Figure 3:
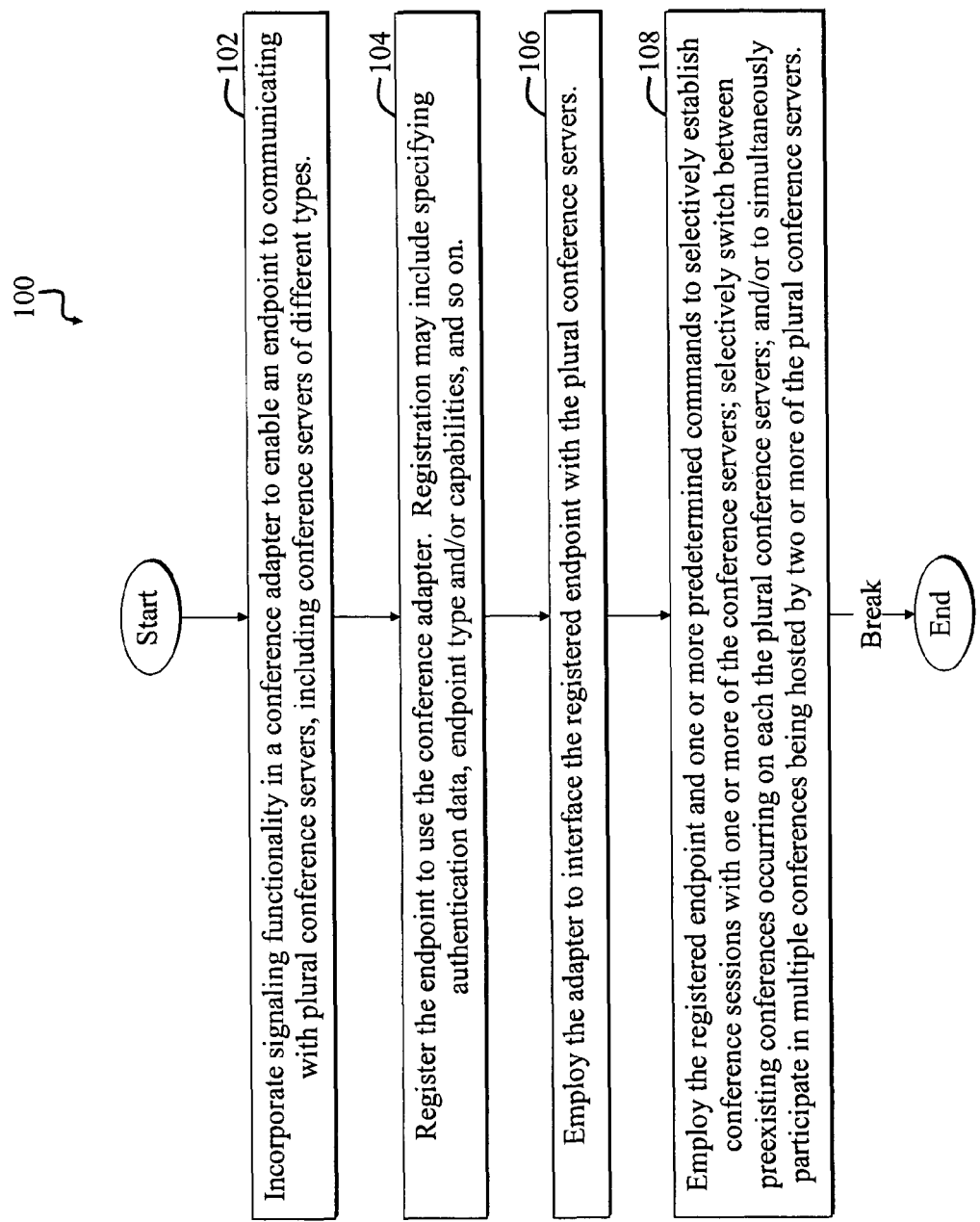
FIG. 3 is a flow diagram of a first method adapted for use with the conference adapter of FIGS. 1-2.

FIG. 3 is a flow diagram of a first method 100 adapted for use with the conference adapter 16 of FIGS. 1-2. The method 100 includes an initial functionality-incorporating step 102 that includes incorporating signaling functionality in a conference adapter, such as the adapter 16 of FIGS. 1-2, to enable an endpoint, such as the endpoints 12, 14 of FIG. 1, to communicating with plural conference servers, including conference servers of different types, such as the conference servers 18-22 of FIG. 1.

A subsequent registering step 104 includes registering the endpoint to use the conference adapter. Registration may include specifying authentication data, endpoint type and/or capabilities, and so on.

Subsequently, an adapting step 106 includes interfacing the registered endpoint with the plural conference servers via the adapter.

Next, an establishing step 108 includes issuing one or more predetermined commands via the registered endpoint to selectively establish conference sessions with one or more of the conference servers; to selectively switch between preexisting conferences occurring on each the plural conference servers; and/or to simultaneously participate in multiple conferences being hosted by two or more of the plural conference servers.

The method 100 ends when a system break occurs, such as in response to terminating all communications with the adapter, turning off the adapter, disabling the network in which the adapter resides, and so on.

Various steps 102-108 of the method 100 may be omitted, or the steps 102-108 may be reordered or modified without departing from the scope of the present invention. For example, an alternative method is discussed more fully below.

FIG. 4 is a flow diagram of a second method 110 adapted for use with the conference adapter 16 of FIG. 1-2. The second method 110 includes an initial incorporating step 112, wherein sufficient signaling functionality is incorporated in a conference adapter to enable plural endpoints, including endpoints of different types, to communicate with a conference server.

In a subsequent endpoint-registering step 114, plural endpoints are registered to use the conference adapter. The endpoint registration may include specifying authentication data, endpoint type and/or capabilities, and so on, for each endpoint.

Subsequently, a conference-interfacing step 116 includes employing the adapter to interface one or more registered endpoints with the conference server.

Next, an implementing step 118 includes employing one or more of the plural endpoints and one or more predetermined commands to selectively switch endpoints and/or types of endpoints during a conference session with the conference server.

Various steps 112-118 may be interchanged or omitted without departing from the scope of the present invention.

With reference to FIGS. 1-4, while embodiments of the invention have been discussed with respect to a conference adapter 16 that is separate from endpoints 12, 14 and from conference server 18-22, embodiments of the present invention are not limited thereto. Conference-adapter functionality may be implemented in an endpoint and/or a conference server without departing from the scope of the present invention. Furthermore, the conference adapter 16 need not be implemented in a physical console. For example, the conference adapter 16 may be implemented via a website. In this case, a client computer and accompanying Web browser may act as a participating endpoint.

Page: 20

Although embodiments of the invention are discussed primarily with respect to server-client architecture, any acceptable architecture, topology, protocols, or other network and digital processing features can be employed. In general, network controllers, managers, access points, endpoints, clients, and so on, can be implemented via any device with processing ability or other requisite functionality.

Although processes of the present invention and the hardware executing the processes may be characterized by language common to a discussion of the Internet (e.g., "client," "server," "peer"), it should be apparent that operations of the present invention can execute on any type of suitable hardware in any communication relationship to another device on any type of link or network.

Although a process of the present invention may be presented as a single entity, such as software executing on a single machine, such software can readily be executed on multiple machines. That is, there may be multiple instances of a given software program, a single program may be executing on two or more processors in a distributed processing environment, parts of a single program may be executing on different physical machines, etc. Furthermore, two different programs, such as a client and server program, can be executing in a single machine, or in different machines. A single program can be operating as a client for one information transaction and as a server for a different information transaction.

Any type of processing device can be used as a client. For example, portable computing devices such as a personal digital assistant (PDA), cell phone, laptop computer, or other devices can be employed. In general, the devices and manner of specific processing (including location and timing) are not critical to practicing important features of the present invention.

Although the invention has been discussed with respect to specific embodiments thereof, these embodiments are merely illustrative, and not restrictive, of the invention. Embodiments of the present invention can operate between any two processes or entities including users, devices, functional systems, or combinations of hardware and software. Peer-to-peer networks and any other networks or systems where the roles of client and server are switched, change dynamically, or are not even present are within the scope of the invention.

Any suitable programming language can be used to implement the routines or other instructions employed by various network entities. Exemplary programming languages include C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "machine-readable medium" or "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented in whole or in part by using a programmed general purpose digital computer; by using application specific integrated circuits, programmable logic devices, field programmable gate arrays, optical, chemical, biological, quantum or nanoengineered systems or mechanisms; and so on. In general, the functions of the present invention can be achieved by any means as is known in the art. Distributed or networked systems, components, and/or circuits can be used. Communication, or transfer of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow "a", "an", and "the" include plural references unless the context clearly dictates otherwise. Furthermore, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

We claim:

1. A method for interfacing one or more conference endpoints with one or more conference servers, the method comprising:
    enabling a conference adapter to interface with a first conference server using a first signaling functionality and a second conference server using a second signaling functionality;
    registering, with the conference adapter, the first conference server using the first signaling functionality and the second conference server using the second signaling functionality, with registration information associated with each conference server that includes additional interface commands employed by the conference server;
    registering, with the conference adapter, a first endpoint using the first signaling functionality and a second endpoint using the second signaling functionality;
    receiving at the conference adapter, a connection request from the first endpoint to establish a connection to a conference session hosted by the second conference server;
    determining, using the conference adapter, signaling functionality translation between the first endpoint and the second conference server based on the first endpoint registration information and the second conference server registration information; and
    selectively establishing communications, using the conference adapter, between the first endpoint and the second conference server based on the signaling functionality translation, while maintaining communications between the conference adapter and the second conference server using the second signaling functionality and between the conference adapter and the first endpoint using the first signaling functionality.

2. The method of claim 1, further including:
    receiving plural connections from conference servers of disparate types.

3. The method of claim 2, further including:
selectively switching communications between the endpoint and a first conference server to communications between the endpoint and a second conference server.

4. The method of claim 3, wherein the first conference server and the second conference server are of different type.

5. The method of claim 1, further including:
selectively transitioning communications between a first endpoint and the conference server to communications between a second endpoint and the conference server.

6. An apparatus for interfacing one or more conference endpoints with one or more conference servers, the apparatus comprising:
a registration module adapted to register an endpoint using a first signaling functionality and plural conference servers using a plurality of signaling functionalities with conference-server registration information associated with each of the plural conference servers that includes additional interface commands employed by the conference server;
an interface module adapted to determine signaling functionality translation between the endpoint and each of the conference servers based on the endpoint registration information and the conference server registration information associated with each conference server; and
a control module adapted to receive connections from each of the conference servers and a connection request from the endpoint to each of the conference servers and to selectively establish communications between the endpoint and one or more of the plural conference servers based on the signaling functionality translation, while maintaining communications between the control module and each of the conference servers using the signaling functionality associated with the conference server and between the control module and the endpoint using the first signaling functionality.

7. The apparatus of claim 6, wherein the one or more conference servers include:
plural conference servers of different types.

8. The apparatus of claim 7, wherein the endpoint registration information includes:
endpoint functionality or capabilities.

9. The apparatus of claim 8, wherein conference-server registration information includes conference server functionality or capabilities.

10. The apparatus of claim 8, wherein the control module further includes:
interface functionality usable by the endpoint, wherein the interface functionality providing common functionality usable by the endpoint for communications with each of the conference servers.

11. The apparatus of claim 10, wherein the interface functionality includes:
an interface converter adapted to convert interface functions associated with each of the conference servers to a common set of interface functions usable by the endpoint based on the endpoint registration information.

12. The apparatus of claim 8, wherein the controller further includes:
switching functionality adapted to enable the endpoint to selectively communicate with each of the conference servers based on control input by the endpoint.

13. The apparatus of claim 12, wherein the control input includes:
login information employed by the controller to initially establish connections with each of the conference servers.

14. The apparatus of claim 13, wherein the controller includes:
one or more routines for mapping conference-server login information associated with each of the conference servers with adapter login information associated with the controller so that an endpoint may log into each of the conference servers by logging into the controller via the adapter login information.

15. The apparatus of claim 7, further including:
a bridging module adapted to interconnect conferences hosted by each of the plural conference servers.

16. A method for interfacing plural conference endpoints with a conference server, the method comprising:
enabling a conference adapter to interface with a first endpoint using a first signaling functionality and a second endpoint using a second signaling functionality;
registering, with the conference adapter, a conference server using the first signaling functionality with registration information associated with the conference server that includes additional interface commands employed by the conference server;
registering, with the conference adapter, a first endpoints using the first signaling functionality and a second endpoint using the second signaling functionality and a conference server using the first signaling functionality;
receiving, at the conference adapter, a connection request from the first endpoint to connect to a conference session hosted by the conference server and a connection request from the second endpoint to connect to a conference session hosted by the conference server;
determining, using the conference adapter, signaling functionality translation between the first endpoint and the conference server based on the first endpoint registration information and the conference server registration information and signaling functionality translation between the second endpoint and the conference server based on the second endpoint registration information and the conference server registration information; and
selectively establishing communications, using the conference adapter, between the first endpoints and the conference server and the second endpoint and the conference server based on the signaling functionality translation, while maintaining communications between the conference adapter and the conference server using the first signaling functionality, between the conference adapter and the first endpoint using the first signaling functionality and between the conference adapter and the second endpoint using the second signaling functionality.

17. An apparatus for interfacing plural conference endpoints with a conference server, the apparatus comprising:
a registration module adapted to register a first endpoints using a first signaling functionality, a second endpoint using a second signaling functionality and a conference server using the first signaling functionality with registration information associated with the conference server that includes additional interface commands employed by the conference server;
an interface module adapted to determine signaling functionality translation between the first endpoint and the conference server and between the second endpoint and the conference server, based on endpoint registration information and the conference server registration information; and
a control module adapted to receive a connection from the conference server, a connection request from the first endpoint to the conference server and a connection request from the second endpoint to the conference server and to selectively establish communications between the first endpoint and the conference server and between the second endpoint and the conference server based on the signaling functionality translation, while maintaining communications between the control module and the conference server using the first signaling functionality, between the control module and the first endpoint using the first signaling functionality and between the control module and the second endpoint using the second signaling functionality.

18. The apparatus of claim 17, wherein the endpoints include:
   endpoints of disparate types.

19. The apparatus of claim 18, wherein said endpoints of disparate types include:
   a phone and a computer.

20. The apparatus of claim 19, wherein the phone includes:
   a cellular phone or a Session Initiation Protocol (SIP) phone.

21. The apparatus of claim 17, wherein the control module further includes:
   one or more routines adapted to selectively interface each of the plural endpoints to plural conference systems.

22. The apparatus of claim 21, wherein the apparatus includes:
   a switching module adapted to switch a communication session occurring between a first endpoint and one or more conference servers to a communication session occurring between a second endpoint and the one or more conference servers.

23. The apparatus of claim 22, wherein the switching module is adapted to implement the switching in response to a control signal received from the first endpoint, without requiring communications between the switching module and the one or more conference servers.

24. The apparatus of claim 17, wherein the control module further communicates with a buffer adapted to selectively record conference information, while a switching module switches a communication session occurring between a first endpoint and one or more conference servers to a communication session occurring between a second endpoint and the one or more conference servers.

25. The apparatus of claim 17, further including:
   an interface converter adapted to convert interface commands or functionality associated with one or more conference servers to interface commands or functionality associated with the apparatus, thereby providing common user interface commands or functionality.

26. The apparatus of claim 17, further including:
   a recorder adapted to record or buffer conference content to facilitate switching between use of different endpoints without loss of conference content.

27. The apparatus of claim 17, further including:
   a conference assistant module adapted to enable an endpoint to receive a call separate from the conference while simultaneously participating in the conference.

28. A system for interfacing conference devices, the system comprising:
   a first type of endpoint adapted to output a first type of signaling or communications;
   a second type of conference server adapted to receive a second type of signaling or communications, wherein the second type is different from the first type; and
   an adapter between the first type of endpoint and the second type of conference server, wherein the adapter includes one or more routines for selectively converting between the first type of signaling or communications and the second type of signaling or communications.

29. The system of claim 28, wherein the second type of signaling includes:
   services offered by the second type of conference server.

30. An apparatus for integrating disparate conference system components, the apparatus comprising:
   first means for establishing a first conference session between a first conference entity using a first signaling functionality and a second conference entity using a second signaling functionality; and
   second means for maintaining the first conference session while switching between the first conference entity and a third conference entity using a third signaling functionality, thereby resulting in the first conference session being between the second conference entity and the third conference entity.

31. The apparatus of claim 30, wherein the first conference entity includes:
   a first type of endpoint.

32. The apparatus of claim 31, wherein the third conference entity includes:
   a second type of endpoint, wherein the first type is different from the second type.

33. The apparatus of claim 32, wherein the third conference entity includes:
   plural endpoints, including endpoints of different types or configurations.

34. The apparatus of claim 30, wherein the second conference entity includes:
   a second type of endpoint.

35. The apparatus of claim 34, wherein the first conference entity includes:
   a first type of conference server.

36. The apparatus of claim 35, wherein the third conference entity includes:
   a second type of conference server.

37. The apparatus of claim 36, wherein the third conference entity includes:
   plural conference servers, including conference servers of disparate types.

38. The apparatus of claim 30, wherein the apparatus includes a device for implementing the first and second means, wherein the device is coupled between the first conference entity and the second conference entity and/or between the third conference entity and the second conference entity.

39. The apparatus of claim 38, wherein the device includes a conference endpoint console, wherein the conference endpoint console further includes:
   third means for registering an endpoint corresponding to the first conference entity and determining endpoint functionality in response there to;
   fourth means for registering a conference server corresponding to the second conference entity and determining conference server functionality in response thereto; and
   fifth means for determining compatible functionality between the endpoint and the conference server based on the endpoint functionality and the conference functionality and employing the compatible functionality to facilitate communications between the endpoint and the conference server.

40. An apparatus for integrating disparate conference system components, the apparatus comprising:

one or more processors and a non-transitory machine-readable medium including instructions executable by the one or more processors for establishing a first conference session between a first conference entity using a first signaling functionality and a second conference entity using a second signaling functionality; and maintaining the first conference session while switching between the first conference entity and a third conference entity using a third signaling functionality, thereby resulting in the first conference session being between the second conference entity and the third conference entity.

41. A non-transitory machine-readable medium including instructions executable by a processor for integrating disparate conference system components, the non-transitory machine-readable medium comprising one or more instructions for:

establishing a first conference session between a first conference entity using a first signaling functionality and a second conference entity using a second signaling functionality; and maintaining the first conference session while switching between the first conference entity and a third conference entity using a third signaling functionality, thereby resulting in the first conference session being between the second conference entity and the third conference entity.

42. A method for integrating disparate conference system components, the method comprising:

establishing a first conference session between a first conference entity using a first signaling functionality and a second conference entity using a second signaling functionality; and maintaining the first conference session while switching between the first conference entity and a third conference entity using a third signaling functionality, thereby resulting in the first conference session being between the second conference entity and the third conference entity.

* * * * *